Feb. 20, 1923.
H. E. ENSLIN.
LACING MACHINE.
FILED APR. 19, 1919.
1,446,167.
2 SHEETS—SHEET 1.
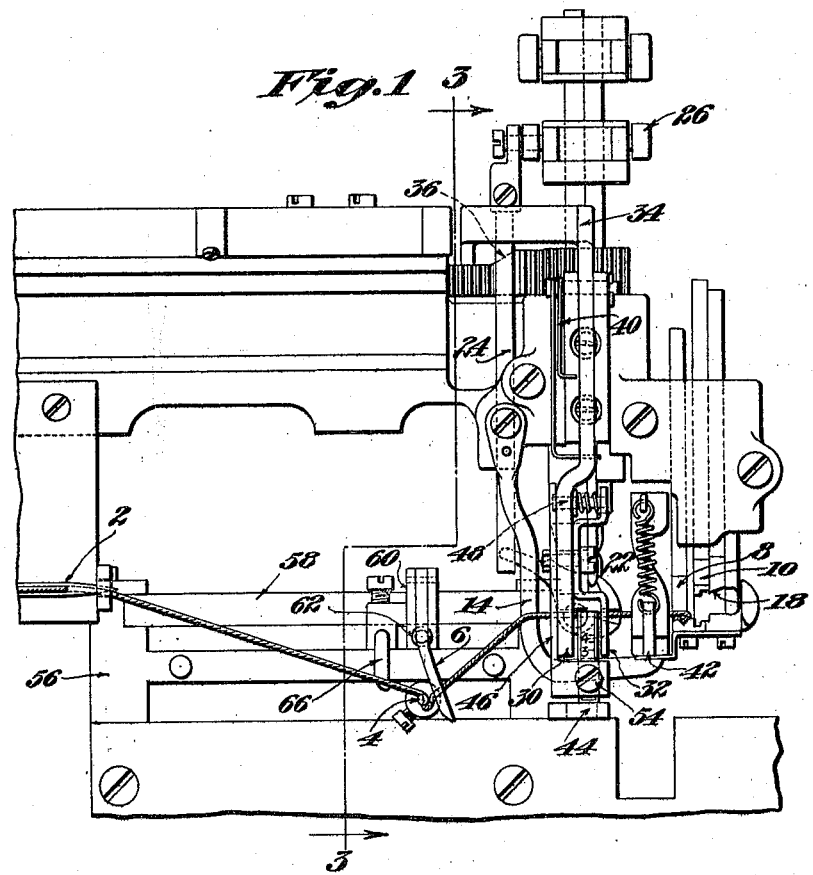
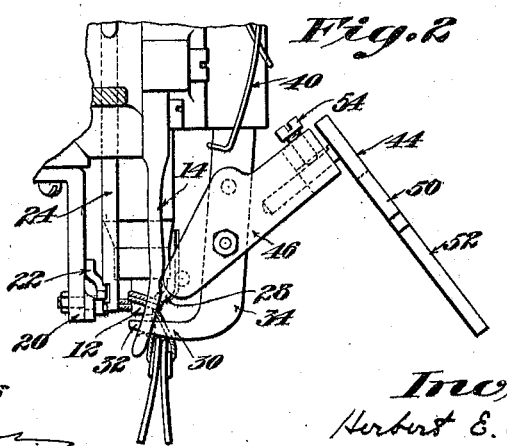
Witness
M. G. Crozier
Inventor
Herbert E. Enslin
by Van Everen Fish & Hildreth
Attys

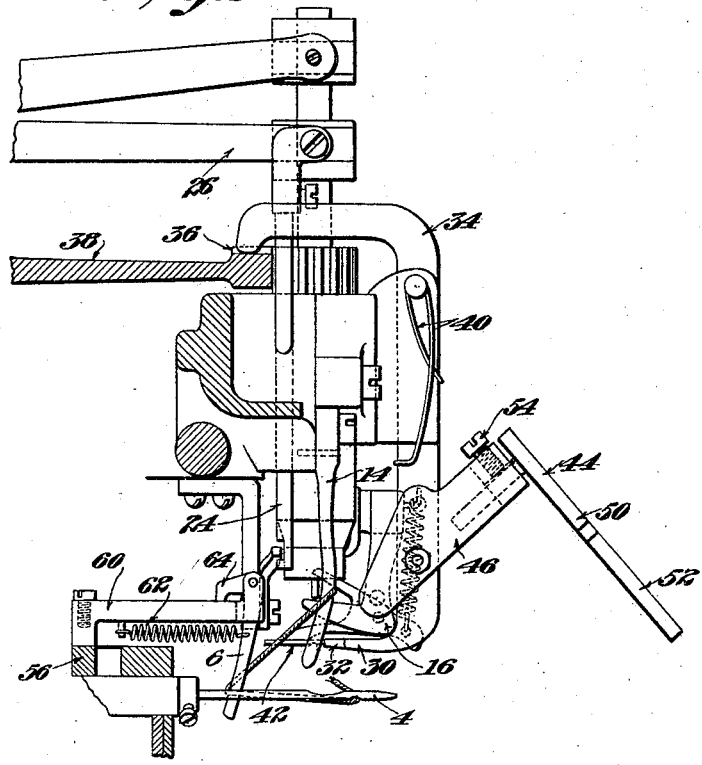

Patented Feb. 20, 1923.

1,446,167

UNITED STATES PATENT OFFICE.

HERBERT E. ENSLIN, OF MALDEN, MASSACHUSETTS, ASSIGNOR TO UNITED SHOE MACHINERY CORPORATION, OF PATERSON, NEW JERSEY, A CORPORATION OF NEW JERSEY.

LACING MACHINE.

Application filed April 19, 1919. Serial No. 291,309.

*To all whom it may concern:*

Be it known that I, HERBERT E. ENSLIN, a citizen of the United States, residing at Malden, in the county of Middlesex and State of Massachusetts, have invented certain new and useful Improvements in Lacing Machines; and I do hereby declare the following to be a full, clear, and exact description of the invention, such as will enable others skilled in the art to which it appertains to make and use the same.

The invention relates to machines for lacing shoe uppers.

In doing certain classes of work the lower pair of eyelet holes in a shoe upper are snugly tied together prior to the lasting operation by a lacing cord which is not removed until the shoe is practically finished. This lacing has heretofore been inserted and tied by hand, prior to the insertion of the temporary lacing which unites several additional pairs of eyelet holes for the lasting operation only. The primary object of the present invention is to provide a machine which is well adapted for inserting the lacing which permanently connects a single pair of eyelet holes.

It is important that the free ends of the cord projecting from the knot of the lacing which connects the two lower eyelets of the upper be comparatively short, so that they will not be pressed against and mar or injure the upper during the lasting and subsequent operations on the shoe. One feature of the invention accordingly contemplates the provision in a machine for inserting and knotting the lacing cord of means for trimming or cutting off the free or waste cord ends so that they will terminate comparatively close to the knot. In embodying this feature of the invention in a machine having the general construction and mode of operation of the machine shown and described in Patent No. 1,030,573, which is commonly used in lacing shoe uppers, the cord ends are preferably trimmed by a cutter operating to cut the cord ends after the knot has been partially tied, and so arranged with relation to the knotter that the ends will be drawn substantially up to the knot as the knotter draws the two cord ends through the loop in completing and tightening the knot.

The invention also includes further features which cooperate in forming and tightening the knot at the proper distance from the edges of the upper to give the desired length to the inserted lacing.

The invention is illustrated in the accompanying drawings, in which Figure 1 is a partial front elevation of the machine embodying the preferred form of the invention; Fig. 2 is a partial side elevation looking toward the right in Fig. 1, showing the knot partially tied; Fig. 3 is a sectional side elevation on the line 3—3, of Fig. 1; Fig. 4 is a view similar to Fig. 2 showing a machine adjusted to operate on blucher shoes; and Figs. 5 and 6 are details of the cord end cutter and blucher work support.

The machine shown has the general construction and mode of operation of the machine of Patent No. 1,030,573 above referred to. The machine is provided with a reciprocating needle 2 which feeds the cord into position to be engaged by a loop inserting spindle 4 and co-operating looper finger 6, and also passes a portion of the cord through the loop after it has been inserted in the lower eyelet holes of the upper, fixed cord grippers 8 and 10 for holding the ends of the cord, a knotter 12 for tying the ends together, a guide bar 14 for guiding the cord into position to be engaged by the needle, a reciprocating gripper 16 for acting on the cord ends between the knotter and the fixed grippers, and a cutter 18 for severing the cord from the cord supply. The machine is also provided with a work adjuster for positioning the upper on the spindle, which has been omitted in the drawings for the sake of clearness. These parts are actuated as fully described in the patent referred to, except so far as their movements are modified or timed to co-operate with other parts in tying the knot at the proper distance from the edges of the upper and in trimming the cord ends.

The cord ends are trimmed in the machine shown by a cutter arranged back of the knotter and comprising the fixed blade 20 and the movable blade 22. The movable blade is formed on one end of a lever, the other end of which engages a notch in a vertically movable bar 24. The upper end of the bar is pivoted to the lever 26 which operates one of the semi-cylindrical sections of the knotter post. When the knotter is moved down to bring it into position to act on the cords leading from the guide bar 14 to the fixed grippers, the cutter blades are opened, and when the knotter post is raised to draw a bight of the cord ends through the loop previously formed about the post, the cutter blades are closed to sever the cord ends comparatively close to the post and preferably at such a distance from the loop that they will terminate just below the loop when the knot is tightened.

When the upper is discharged from the spindle 4, it is suspended from the latch 28 of the knotter by the loop of lacing cord which extends from the fixed grippers through the latch and thence through the eyelet holes of the upper, and the position of the upper and lacing during the tying of the knot is determined by a work support comprising two fingers 30 and 32 projecting rearwardly from the lower end of the lever 34, and spaced to straddle the cord between the upper and the knotter. The finger 32 is longer than the finger 30, and at the time the upper is discharged from the spindle it acts as a stop for positioning the cord as it passes back of the finger 30 when the upper swings down into position below the fingers. The fingers are advanced into position over the edges of the upper by a cam 36 formed on the segment lever 38 and arranged to engage the upper end of the lever 34. A spring 40 holds the end of the lever against the cam and tends to retract the fingers into the position indicated in Fig. 3.

After the work supporting fingers have been advanced into position above the upper, the reciprocating cord gripper 16 moves rearwardly and the shoulder at the base of the movable jaw of the gripper acts upon the cord between the knotter and the fixed grippers 8 and 10 and draws the edges of the upper snugly against the under side of the work positioning fingers. During the first part of the rearward movement of the reciprocating gripper, the tail of the movable jaw rides on a plate 42 so that the jaws of the gripper remain open, allowing the gripper to act as a takeup for drawing the edges of the upper against the work support while the ends of the lacing are still retained by the fixed grippers. The tail then rides off the plate and the jaw closes, and thereafter the gripper carries the ends of the cord back between the blades 20 and 22 of the cord end cutter, and also carries the cords between the jaws of the gripper at the lower end of the knotter post. The knotter is then actuated to form the loop about the post, and to draw a bight of the cord ends up through the loop, as more fully described in the patent above referred to. As the knot is completed and tightened, the cord cutter is operated to cut the ends of the cord so that they terminate approximately at the loop of the knot as the knot is completed. The knot is thus tied close to the edges of the upper, and the ends of the cord are trimmed close to the knot, so that there are no projecting ends to be pressed against the upper during the lasting and subsequent operations.

In lacing blucher shoes, a comparatively long lacing should be inserted, and in order to secure this result the machine is provided with an auxiliary or blucher work support 44. This support is mounted in a lever 46 pivoted to the lever 34, and held in either active or inactive position by a spring latch pin 48 adapted to engage one of two holes formed in the lever. The support comprises a plate having two work positioning fingers indicated at 50 and 52 which are spaced so that they may straddle the cords leading from the upper to the knotter when the support is adjusted into active position. The finger 52 is considerably longer than the finger 50, so that it will act as a stop in the same manner as the finger 32, and the finger 50 is so proportioned that the cords may pass back of it as the upper swings into position below the fingers when it is discharged from the spindle 4. The fingers are advanced into position above the edges of the upper by the cam 36 acting on the upper end of the lever 34 as in the case of the work supporting fingers 30 and 32. The plate 44 is provided with a shank fitting within a hole in the end of the lever 46 and adjustably held therein by a set screw 54, so that the support may be adjusted to give the proper length of lacing for the size or style of shoe being operated upon.

The spindle 4 is mounted on a carrier 56 corresponding to the spindle carrier of the patent referred to, and a supporting block 60 for the looper finger 6 is mounted on a slide 58 corresponding to the looper slide of said patent. In order that the cord leading from the spindle to the fixed gripper 8 may be held taut and maintained in position to be operated upon by the knotter, when the carrier 56 moves from its upper receiving position into position for the passage of the shuttle needle through the loop which has been passed through the eyelets of the upper, the looper finger 6 is so mounted that it will act to take up the slack in the lacing which would otherwise occur. As shown, the looper finger is pivoted on its supporting block 60, and is drawn rearwardly by a spring 62. When the loop in the lacing cord is formed by the rearward movement of the slide 58 and looper finger, the finger is drawn forward against the tension of the spring until its forward movement is arrested by the engagement of a tail piece 64 on the upper end of the finger with the upper side of the block 60. When the carrier 56 moves upward, any slack in the lacing will be taken up by the rearward movement of the looper finger under the influence of the spring 62, and the cord will thus be held taut between the spindle and the fixed gripper 8. The slide 58 may carry an ejector finger 66 arranged to engage the upper and co-operate with the looper finger 6 in discharging the upper from the spindle.

While it is preferred to employ the specific construction and arrangement of parts shown and described in embodying the invention in a machine having the general construction and mode of operation of the machine shown and described in the patent above referred to, this construction is not essential, and may be varied or modified as found desirable or best suited to the construction of the machine in which the invention is to be embodied. It will also be understood that various features of the invention may be embodied with advantage in machines adapted for inserting a lacing in a plurality of pairs of eyelets.

What is claimed is:—

1. A lacing machine, having, in combination, means for inserting a lacing in the eyelet holes of an upper and for tying the ends of the lacing, and means for cutting off the waste ends of the lacing.

2. A lacing machine, having, in combination, means for inserting a lacing cord in the eyelet holes of an upper including means for gripping the ends of the cord, a knotter for tying the ends of the cord, and a cutter for trimming the cord ends between the knotter and gripping means.

3. A lacing machine, having, in combination, means for inserting a lacing in a single pair of eyelets in a shoe upper and for tying the ends of the lacing, and means for trimming the lacing ends.

4. A lacing machine, having, in combination, means for forming a loop in a lacing cord to be passed through a pair of eyelet holes in a shoe upper and for passing the cord through the loop, grippers for holding the ends of the cord, a knotter for tying a knot in the ends of the cord, and means for trimming the cord ends between the knotter and grippers.

5. A lacing machine, having, in combination, means for inserting a lacing cord in the eyelet holes of an upper, means for forming a loop in the cord ends and drawing a bight therethrough, and means for trimming the cord ends.

6. A lacing machine, having, in combination, means for forming a loop in a lacing cord to be passed through a pair of eyelet holes in an upper and for passing the cord through the loop, grippers for holding the ends of the cord, a knotter from which the upper is suspended by the cord, a work support, and a takeup acting on the cord between the grippers and the knotter to draw the edges of the upper against the work support.

7. A lacing machine, having, in combination, means for forming a loop in a lacing cord to be passed through a pair of eyelet holes in an upper and for passing the cord through the loop, grippers for holding the ends of the cord, a knotter from which the upper is suspended by the cord, a work support, a takeup acting on the cord between the grippers and work support to draw the edges of the upper against the work support, and a cutter for cutting the cord between the takeup and knotter.

8. A lacing machine, having, in combination, means for forming a loop in a lacing cord to be passed through a pair of eyelet holes in an upper and for passing a cord through the loop, grippers for holding the ends of the cord, a knotter from which the upper is suspended by the cord, a work support having spaced fingers for embracing the cord and overlying the upper, and means for advancing and retracting the support.

9. A lacing machine, having, in combination, means for forming a loop in a lacing cord to be passed through a pair of eyelet holes in an upper and for passing the cord through the loop, grippers for holding the ends of the cord, a knotter from which the upper is suspended by the cord, a work support adapted to overlie the upper, means for advancing and retracting the support, and an auxiliary support adapted to be brought into position to increase the length of the inserted lacing.

10. A lacing machine, having, in combination, a looper spindle, and a spring operated looper finger mounted to yield in co-operating with the spindle to form the loop in the lacing cord which is passed through the work.

11. A lacing machine, having, in combination, a looper spindle, a fixed cord gripper, a knotter for acting on the cord between the gripper and spindle, and a spring pressed looper finger mounted to yield in co-operating with the spindle to form a loop in the lacing cord whereby the cord is held taut between the spindle and gripper.

12. A lacing machine, having, in combination, a spindle, a spindle carrier, a looper slide thereon, a fixed gripper, a guide for the cord leading from the spindle to the gripper, a knotter for acting on the cord between the guide and gripper, and a spring pressed looper finger on the slide from which the cord leads over the guide to the gripper.

13. A lacing machine, having, in combination, a vertically movable spindle carrier, a spindle thereon, a looper slide mounted on the carrier, a fixed gripper, a guide for the lacing cord, a knotter for acting on the cord between the guide and gripper, and a spring pressed looper finger mounted on the slide for engaging the cord between the spindle and guide.

14. A lacing machine having, in combination, a looper spindle and a looper finger relatively movable lengthwise of the spindle in forming the loop in the lacing cord which is passed through the work, a carrier for the looper finger, and means for permitting a limited movement of the finger on its carrier in forming the loop.

15. A lacing machine having, in combination, a looper spindle and a looper finger relatively movable lengthwise of the spindle in forming the loop which is passed through the work and yieldingly mounted to maintain the lacing taut.

HERBERT E. ENSLIN.